(12) United States Patent
Tezuka et al.

(10) Patent No.: US 11,044,319 B2
(45) Date of Patent: Jun. 22, 2021

(54) EQUIPMENT ANALYSIS SUPPORT APPARATUS, EQUIPMENT ANALYSIS SUPPORT METHOD, AND EQUIPMENT ANALYSIS SYSTEM

(71) Applicant: HITACHI, LTD., Tokyo (JP)

(72) Inventors: Shin Tezuka, Tokyo (JP); Tomoya Oota, Tokyo (JP); Yuji Kakutani, Tokyo (JP)

(73) Assignee: HITACHI, LTD., Tokyo (JP)

(*) Notice: Subject to any disclaimer, the term of this patent is extended or adjusted under 35 U.S.C. 154(b) by 288 days.

(21) Appl. No.: 16/299,827

(22) Filed: Mar. 12, 2019

(65) Prior Publication Data

US 2020/0068019 A1 Feb. 27, 2020

(30) Foreign Application Priority Data

Aug. 24, 2018 (JP) .............................. JP2018-157039

(51) Int. Cl.
| | |
|---|---|
| G06F 17/00 | (2019.01) |
| H04L 29/08 | (2006.01) |
| H04L 12/24 | (2006.01) |
| G08B 21/18 | (2006.01) |
| H04N 19/96 | (2014.01) |
| H04N 19/176 | (2014.01) |

(Continued)

(52) U.S. Cl.
CPC ............ H04L 67/12 (2013.01); G08B 21/187 (2013.01); H04L 41/0816 (2013.01); G01M 99/005 (2013.01)

(58) Field of Classification Search
USPC .................................................. 709/221, 223
See application file for complete search history.

(56) References Cited

U.S. PATENT DOCUMENTS

| 7,171,393 B2 * | 1/2007 | Naveh ....................... G06F 8/31 |
| | | 706/19 |
| 7,587,376 B2 * | 9/2009 | Sabato ..................... G06N 5/00 |
| | | 706/19 |

(Continued)

FOREIGN PATENT DOCUMENTS

| JP | 2015-156182 A | 8/2015 |
| JP | 2017-208747 A | 11/2017 |

*Primary Examiner* — Jude Jean Gilles
(74) *Attorney, Agent, or Firm* — Volpe Koenig

(57) ABSTRACT

An equipment analysis support apparatus includes an equipment constraint information storage unit that stores equipment constraint information which is a correspondence relationship between each process constituting work performed using a plurality of pieces of equipment and a constraint to be imposed on the equipment in each process; a work process information acquisition unit that acquires work process information which is information on a process of the work currently in progress; a configuration information generation unit that, when it is determined that a current work state is changed, specifies a constraint to be imposed on the equipment in the changed work state and generates a configuration of analysis processing of the equipment satisfying the specified constraint based on the acquired work process information and the equipment constraint information; and a processing execution unit that performs processing necessary for analysis of the equipment based on the generated configuration.

15 Claims, 13 Drawing Sheets

(51) Int. Cl.
*H04N 19/157* (2014.01)
*G01M 99/00* (2011.01)

(56) References Cited

U.S. PATENT DOCUMENTS

| | | | | |
|---|---|---|---|---|
| 7,890,205 | B2* | 2/2011 | Hama | B21B 37/00 |
| | | | | 700/149 |
| 7,966,151 | B2* | 6/2011 | Filev | G05B 23/0283 |
| | | | | 702/182 |
| 9,507,594 | B2* | 11/2016 | Robison | G06F 9/30036 |
| 10,248,620 | B2* | 4/2019 | Tran | G06F 16/284 |
| 10,678,194 | B2* | 6/2020 | Dave | G05B 23/0272 |
| 10,812,835 | B2* | 10/2020 | Wang | H04N 19/176 |
| 2009/0125352 | A1* | 5/2009 | Miyake | G06Q 10/06 |
| | | | | 705/7.15 |

* cited by examiner

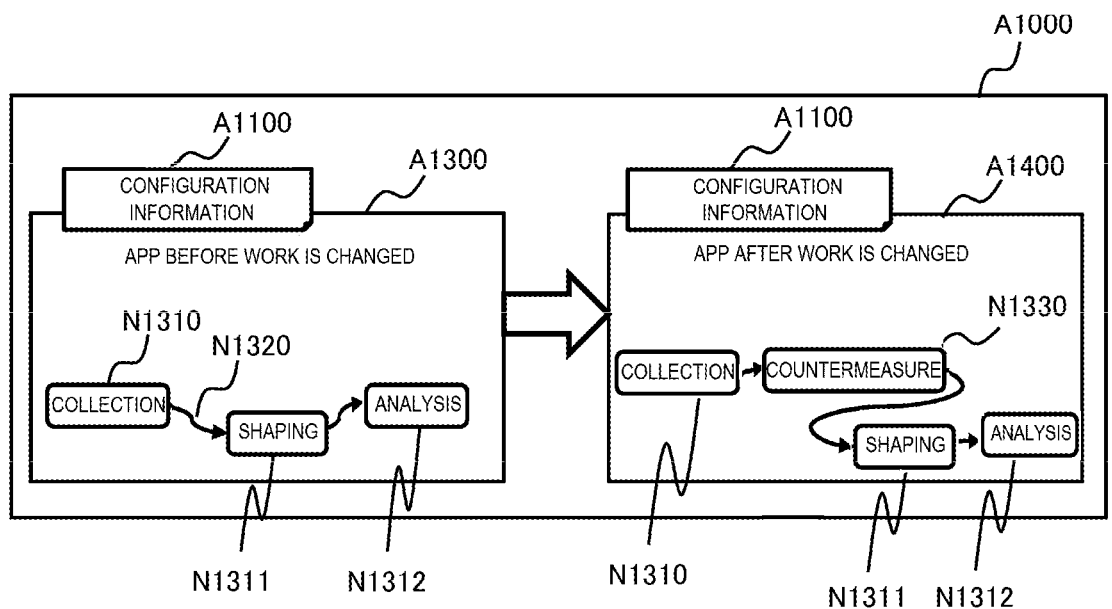

FIG. 7

APP INFORMATION TABLE (T1000)

| APP IDENTIFIER (T1010) | NAME (T1020) | REQUIREMENT (T1030) | ARRANGED FLAG (T1040) | PRIORITY (T1050) | ... |
|---|---|---|---|---|---|
| 1 | COATING ROBOT FAULT SYMPTOM DIAGNOSIS | DATA TRANSFER DELAY: 10 ms OR LESS<br><br>DATA FRESHNESS: WITHIN 10 SECONDS | YES | 100 | ... |
| 2 |  |  | NO | 50 | ... |
| ... | ... | ... |  |  | ... |

FIG. 8

NODE MANAGEMENT TABLE (T3000)

| NODE IDENTIFIER (T3010) | APP IDENTIFIER (T3020) | NODE TYPE (T3030) | IN NODE (T3040) | OUT NODE (T3050) | ARRANGEMENT CONSTRAINT (T3060) | COLLECTION FREQUENCY (T3070) | DATA SIZE (T3080) | ... |
|---|---|---|---|---|---|---|---|---|
| 1 | 1 | DATA COLLECTION | MES: COATING ROBOT: TEMPERATURE SENSOR | NODE 2 | FIELD EDGE | EVERY 1 SECOND | 1 BYTES | ... |
| 2 | 1 | AGGREGATION | NODE 2 | NODE 3 | CLOUD | - |  | ... |
| ... | ... | ... | ... | ... | ... |  |  | ... |

FIG. 9

EQUIPMENT CONSTRAINT INFORMATION TABLE (T4000)

| CONSTRAINT IDENTIFIER (T4010) | WORK PROCESS IDENTIFIER (T4020) | EQUIPMENT INFORMATION (T4030) | CONSTRAINT INFORMATION (T4040) | ... |
|---|---|---|---|---|
| 1 | 1 | MES | 10 RPS OR LESS | ... |
| 2 | 2 | MES | 1 RPS OR LESS | ... |
| ... | ... | ... | ... | ... |

FIG. 10

CONFIGURATION PLAN TABLE (T5000)

| CONFIGURATION PLAN IDENTIFIER (T5010) | ARRANGEMENT INFORMATION (T5020) | ROUTE INFORMATION (T5030) | EVALUATION VALUE (T5050) | ... |
|---|---|---|---|---|
| 1 | App 1: node 1 = edge,<br>App 1: node 2 = edge,<br>App 1: node 3 = cloud,<br>App 1: node 4 = cloud,<br>App 2: node A = edge,<br>App 2: node B = edge,<br>App 2: node C = cloud,<br>App 2: node D = cloud,... | 192.168.1.100:/robot_A_temperature,<br>192.168.1.100:/robot_B_temperature,<br>... | 90 | ... |
| 2 | App 1: node 1 = edge,<br>App 1: countermeasure node 1 = edge,<br>App 1: node 2 = edge,<br>App 1: node 3 = cloud,<br>App 1: node 4 = cloud,<br>App 2: node A = edge,<br>App 2: countermeasure node 2 = edge,<br>App 2: node B = edge,<br>App 2: node C = cloud,<br>App 2: node D = cloud,... | 192.168.1.100:/robot_A_temperature,<br>192.168.1.100:/robot_B_temperature,<br>... | 100 | ... |
| ... | ... | ... | ... | ... |

*FIG. 11*

T6000 COUNTERMEASURE NODE TABLE

| COUNTERMEASURE NODE IDENTIFIER | COUNTERMEASURE NODE TYPE | COUNTERMEASURE NODE PARAMETERS | ... |
|---|---|---|---|
| 1 | CACHE | CACHE TIME: XX SECOND | ... |
| 2 | QUEUE | QUEUE LENGTH: YY BYTE | ... |
| ... | ... | ... | ... |

EQUIPMENT ANALYSIS SUPPORT APPARATUS, EQUIPMENT ANALYSIS SUPPORT METHOD, AND EQUIPMENT ANALYSIS SYSTEM

CROSS-REFERENCE TO RELATED APPLICATION

This application claims priority pursuant to 35 U.S.C. § 119 from Japanese Patent Application No. 2018-157039, filed on Aug. 24, 2018, the contents of which is incorporated herein by reference in its entirety.

BACKGROUND

Technical Field

The present invention relates to an equipment analysis support apparatus, an equipment analysis support method, and an equipment analysis system.

Related Art

An Internet of Things (IoT) technology that connects various devices to the Internet has been attracting attention. Such an example includes, for diagnosis of a fault symptom for a piece of equipment in a factory, collecting data recycled from each piece of equipment to a cloud via the Internet to perform cross-sectional analysis on the data by using an IoT application (IoT app) on the cloud.

Devices (IoT devices) corresponding to such an IoT app can provide various sensor data such as temperature, pressure, and vibration to the IoT app. These sensor data is temporarily collected via a device called an edge server. The collected sensor data is subjected to preprocessing such as data shaping, cleansing to remove unnecessary data, and aggregating and analyzing by a statistical method. Further, a processing result (processed data) thereof is utilized by the IoT app that operates on the cloud.

However, in many cases, an app that collects such data and equipment existing in the factory are not assumed to exist mutually. For this reason, in order to allow a Manufacturing Execution System (MES) or a programmable logic controller (PLC) in a factory to correspond to access from the IoT app, for example, a worker needs to perform maintenance thereon or change various parameters thereof. However, such an operation may inhibit original work (product manufacturing). As a countermeasure, it is possible to introduce a device that replicates contents of a database held by the MES. However, in order to introduce a new device into the existing equipment, a manufacturing line of the factory needs to be temporarily stopped, and it is often difficult to introduce the device. Such a device also has constraints from a viewpoint of money (cost). Therefore, it is preferable to respond to a request from the app without inhibiting the original work performed by each piece of equipment.

In this regard, for example, JP-A-2017-208747 discloses a method of monitoring equipment in a factory in which, in a distributed system including a front end that responds to access from a requestor and a back end that holds responded data, a flow rate control apparatus specifies the front end and controls a flow rate thereof using a configuration management table indicating a correspondence relationship between the front end and the back end when a back-end load is monitored to have exceeded a threshold. Further, JP-A-2015-156182 discloses a method of separating an inside of a PLC into a general-purpose program Operating System (OS) and a dedicated processing control OS so that the PLC reliably controls machining devices.

According to the invention of JP-A-2017-208747, it is possible to avoid a system of the back end from being overloaded and to respond to the access from the requestor by controlling the flow rate in accordance with the load of the back end. However, in many cases, a load of a flow rate does not change due to maintenance of the equipment. In these cases, the invention according to JP-A-2017-208747 cannot appropriately detect the load.

According to the invention of JP-A-2015-156182, the PLC described in the same document protects performance of the original work intended by the PLC. However, an operation of introducing the PLC having such a function into a present environment is very complicated, and there are many PLCs that do not respond to such a function in an environment such as a factory where a period of equipment replacement is long.

SUMMARY

The invention is made in view of such circumstances, and an object of the invention is to provide an equipment analysis support apparatus, an equipment analysis support method, and an equipment analysis system in which equipment can be analyzed without inhibiting progress of work.

In order to achieve the above problems, an aspect of the invention provides an equipment analysis support apparatus. The equipment analysis support apparatus includes: an equipment constraint information storage unit that stores equipment constraint information which is a correspondence relationship between each process constituting work performed using a plurality of pieces of equipment and a constraint to be imposed on the equipment in each process; a work process information acquisition unit that acquires work process information which is information on a process of the work currently in progress; a configuration information generation unit that, when it is determined that a current work state is changed, specifies a constraint to be imposed on the equipment in the changed work state and generates a configuration of analysis processing of the equipment satisfying the specified constraint, based on the acquired work process information and the equipment constraint information; and a processing execution unit that performs processing necessary for analysis of the equipment based on the generated configuration.

According to the invention, equipment can be analyzed without inhibiting progress of work.

BRIEF DESCRIPTION OF DRAWINGS

FIG. 4 shows an example of an app change;

FIG. 5 shows an example of a work process management table;

FIG. 7 shows an example of an app information table;

FIG. 8 shows an example of a node management table;

FIG. 9 shows an example of an equipment constraint information table;

FIG. 10 shows an example of a configuration plan table;

FIG. 11 shows an example of a countermeasure node table;

DETAILED DESCRIPTION OF THE EMBODIMENTS

Hereinafter, embodiments of the invention are described with reference to the drawings.

<System Configuration>

Figure 1:
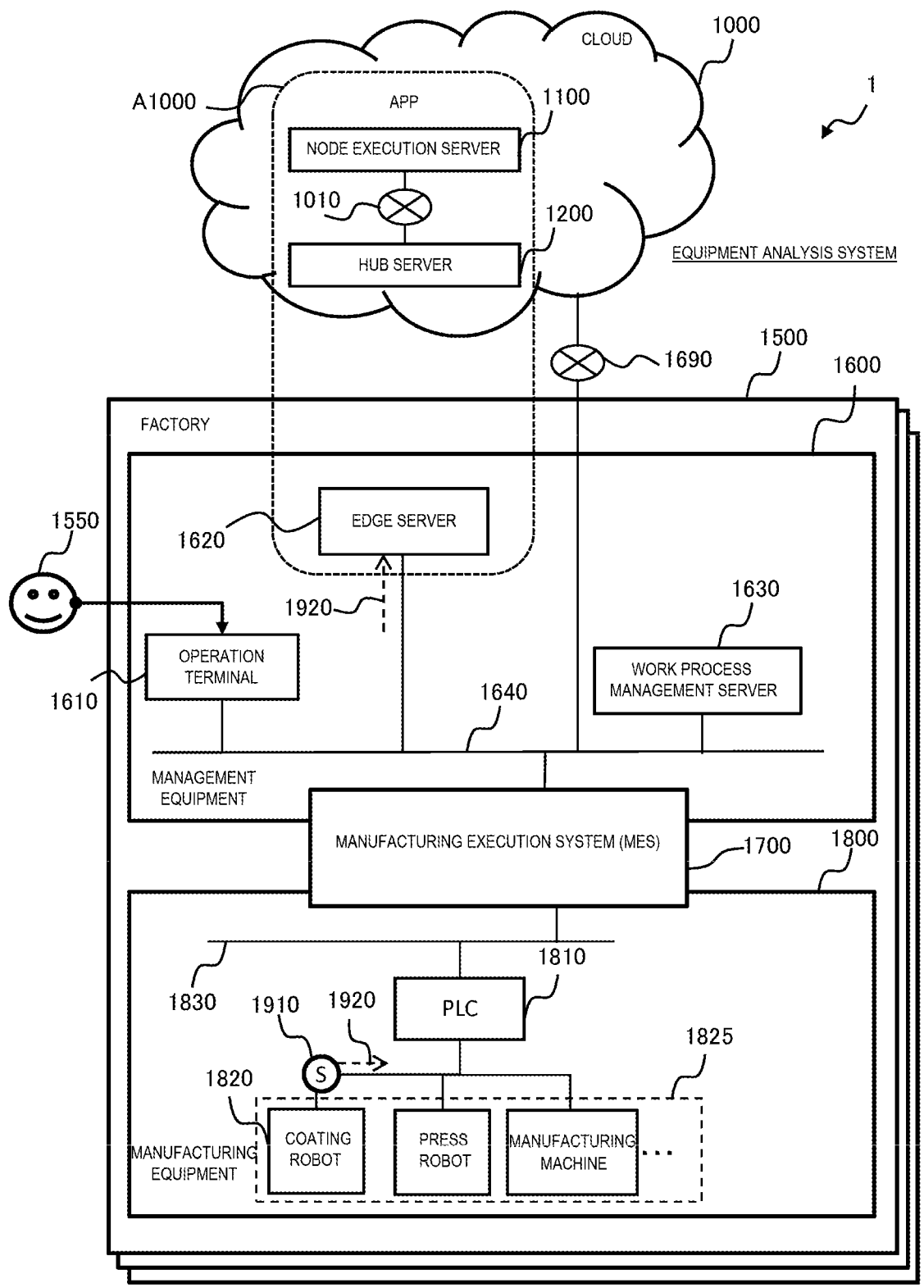
FIG. 1 shows an example of a configuration of an equipment analysis system according to an embodiment.

FIG. 1 shows an example of a configuration of an equipment analysis system 1 according to the present embodiment. The equipment analysis system 1 performs analysis on a piece of equipment 1825 disposed in a factory 1500, and includes a cloud 1000 that is a predetermined information processing system, a plurality of pieces of equipment 1825 including a coating robot 1820 that performs coating on a predetermined product, an MES 1700 (MES: Manufacturing Execution System) that stores data indicating a state of the equipment 1825, an edge server 1620 (equipment analysis support apparatus) that performs predetermined analysis processing based on the collected data, an operation terminal 1610 that operates the edge server 1620 by a user 1550, and a work process management server 1630 that manages work (for example, various work that uses the equipment 1825) performed in the factory 1500. The cloud 1000 may be disposed in the factory 1500 or disposed outside the factory 1500.

The equipment 1825 is disposed in a manufacturing equipment 1800 in the factory 1500. A PLC 1810 (PLC: Programmable Logic Controller) that controls the equipment 1825 is introduced into the manufacturing equipment 1800.

A sensor 1910, which measures temperature and vibration that indicates a state of the equipment 1825, is attached to each piece of equipment 1825 including the coating robot 1820. The equipment 1825 acquires measurement data (sensor data) of the sensor 1910 at any time, and transmits the acquired sensor data to the PLC 1810 at a predetermined timing.

The MES 1700 controls the PLC 1810 and the equipment 1825 and stores predetermined parameters related to a product and a coating of the product. The MES 1700, the equipment 1825, and the PLC 1810 are communicably connected via a field network 1830 such as a MECHATRO-LINK (registered trademark) or a CC-Link (registered trademark).

The edge server 1620, the work process management server 1630, and the operation terminal 1610 are disposed in a management equipment 1600 in the factory 1500. These apparatuses are communicably connected to the MES 1700 by a predetermined IT network 1640.

Here, a predetermined IoT app (IoT: Internet of Things) (hereinafter, referred to as app A1000), which performs analysis on the each piece of equipment 1825 including the coating robot 1820, is introduced into the cloud 1000 and the edge server 1620.

Figure 2:
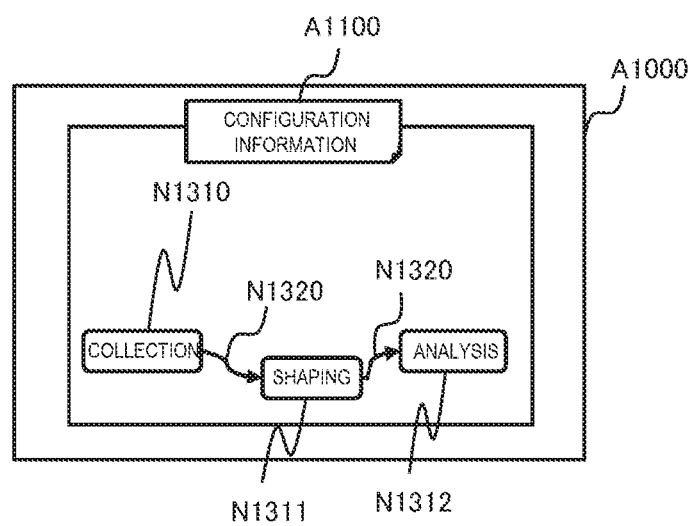
FIG. 2 shows an example of a configuration of an app according to the present embodiment.

Here, FIG. 2 shows an example of a configuration of the app A1000 according to the present embodiment. The app A1000 includes a plurality of processing units (hereinafter referred to as nodes), specifically, a collection node N1310 that performs collection of the sensor data 1920, a shaping node N1311 that performs processing which shapes the sensor date 1920 collected by the collection node N1310, and an analysis node N1312 that performs, based on the data shaped by the shaping node N1311, processing which analyzes a fault symptom of the equipment 1825. A route of the data transmitted and received among the collection node N1310, the shaping node N1311, and the analysis node N1312 is defined by a transfer route N1320.

These nodes are arranged in either the edge server 1620 or the cloud 1000. Hereinafter, a node assigned to the edge server 1620 is referred to as first processing, and a node assigned to the cloud 1000 is referred to as second processing.

Configuration information of the app A1000 is stored as configuration information A1100. The app A1000 is executed in accordance with the configuration information A1100. That is, the configuration information A1100 includes information (arrangement information) indicating whether the collection node N1310, the shaping node N1311, and the analysis node N1312 are separately arranged in either the edge server 1620 or the cloud 1000, and information (route information) that stores contents of the transfer route N1320.

As shown in FIG. 1, the cloud 1000 includes a node execution server 1100 that executes a node (second processing) assigned to the node execution server 1100, and a hub server 1200 that is communicably connected to the node execution server 1100 via a network 1010 and transfers the data between each node. The cloud 1000 is communicably connected to the edge server 1620 via a network 1690 such as the Internet or a dedicated line.

Figure 3:
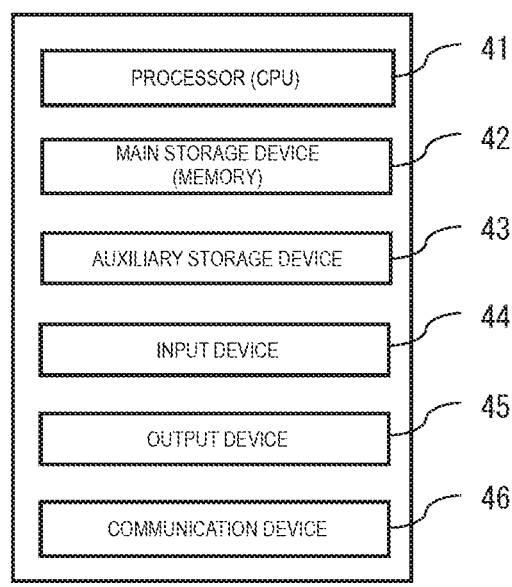
FIG. 3 shows an example of hardware included in each information processing apparatus in the information analysis system.

FIG. 3 shows an example of hardware included in each information processing apparatus in the equipment analysis system 1. Each information processing apparatus (cloud 1000, edge server 1620, operation terminal 1610, work process management server 1630, node execution server 1100 and hub server 1200) includes a processing device 41 (processor) such as a Central Processing Unit (CPU), a main storage device 42 such as a Random Access Memory (RAM) or a Read Only Memory (ROM), an auxiliary storage device 43 including an external storage device such as a Hard Disk Drive (HDD) or a Solid State Drive (SSD), an input device 44 (not required when remote operation is performed by Secure Shell (SSH)) including a keyboard, a mouse, and a touch panel, and an output device 45 including a monitor (display), these devices being connected by an internal bus. These information processing apparatuses may be a physical computer or a virtual computer that operates on the physical computer.

<Function>

First, an overview of functions of the equipment analysis system 1 is described.

(Overview)

Contents of a product coating work process performed in the factory 1500 may change at any time, which may cause a constraint on operation of the app A1000. For example, when work that coating a door of a vehicle in red is changed to work that coating the door of the vehicle in blue, a worker needs to change parameters of the MES 1700 so that a blue coating is executed by the coating robot 1820, and to perform an operation test of the coating robot 1820. Such a change in the work process causes a constraint on frequency of acquisition of the sensor data 1920 that can be requested by the app A1000 from the MES 1700.

The equipment analysis system 1 of the present embodiment can continue the analysis processing without inhibiting the work even when a change occurs in the work process in this manner (for example, when the parameters of the MES 1700 are changed and an operation test of the equipment 1825 is performed). Thus, the worker does not need to refrain from accessing the equipment 1825, the MES 1700, or the PLC 1810 while the parameters are being changed or the operation test is being executed, so that the work can be smoothly performed.

Specifically, in the equipment analysis system 1 according to the present embodiment, when the work process management server 1630 monitors a change in the work process and determines that there is a change in the work process, the edge server 1620 changes the configuration of the current app A1000. When a plurality of configuration plans serve as the configuration of the app A1000, the edge server 1620 calculates an evaluation value of each configuration plan and constructs the app A1000 based on a configuration plan having the highest evaluation value.

FIG. 4 shows an example of a change in the app A1000. An app A1300 before the change includes the collection node N1310, the shaping node N1311, and the analysis node N1312, which are sequentially executed. Meanwhile, in an app A1400 after the change, a countermeasure node N1330 to be described below is added between the collection node N1310 and the shaping node N1311. The collection node N1310, the countermeasure node N1330, the shaping node N1311, and the analysis node N1312 are executed in this order.

The countermeasure node N1330 is a node added to the app A1000 in order to comply with the constraint on use of each equipment 1825 in the factory 1500. The countermeasure node N1330 is, for example, a cache node that accumulates the sensor data 1920 previously acquired by itself for a predetermined time with respect to a request for the sensor data 1920 from outside, or a queuing node that temporarily stops the analysis processing performed by acquiring the sensor data 1920.

Further, a response rejection node may be added as the countermeasure node N1330. The response rejection node denies access to the app A1000. That is, the response rejection node stops the analysis processing performed by the app A1000.

(Function of Information Processing Apparatus)

Next, the function of each information processing apparatus is described.

Figure 6:
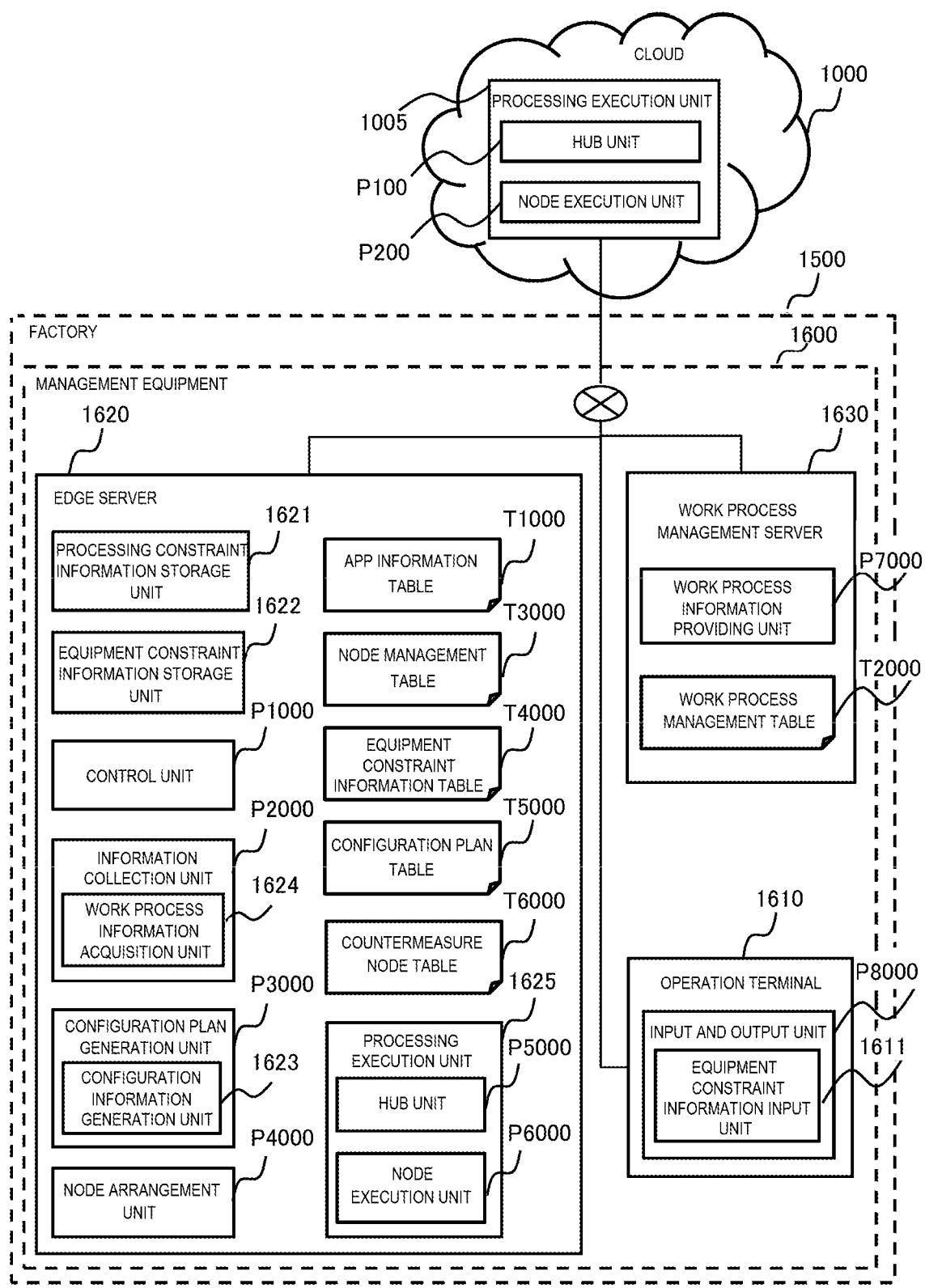
FIG. 6 shows separately an example of functions of an edge server, a work process management server, an operation terminal, and a cloud.

FIG. 6 separately shows an example of functions of the work process management server 1630, the edge server 1620, the operation terminal 1610, and the cloud 1000.

(Work Process Management Server)

First, the work process management server 1630 includes a work process information providing unit P7000 and a work process management table T2000.

The work process information providing unit P7000 transmits information stored in the work process management table T2000 to the edge server 1620. The work process information providing unit P7000 is implemented, for example, by an Application Programming Interface (API).

(Work Process Management Table)

FIG. 5 shows an example of the work process management table T2000. The work process management table T2000 stores work process information on the work process currently in progress. That is, the work process management table T2000 holds information on the work process executed and on the work process scheduled to be executed in the factory 1500.

The work process management table T2000 includes one or more records having items of, a work process identifier T2010 in which a work process identifier is stored, a process T2020 in which a name of a work process (hereinafter referred to as the process in this paragraph) indicating an item of the work process identifier T2010 is stored, a product T2030 in which information on a product manufactured in the process is stored, an in-execution flag T2040 in which an in-execution flag (for example, represented by a character string such as a Yes, No or a numerical value) is stored as information indicating whether the process is being executed, a scheduled start time T2050 in which a scheduled start time of the process is stored, and a scheduled completion time T2060 in which a scheduled completion time of the process is stored.

(Edge Server)

The edge server 1620 includes a processing constraint information storage unit 1621, an equipment constraint information storage unit 1622, a control unit P1000, an information collection unit P2000, a configuration plan generation unit P3000, a node arrangement unit P4000 and a processing execution unit 1625. Further, the edge server 1620 stores an app information table T1000, a node management table T3000, an equipment constraint information table T4000, a configuration plan table T5000, and a countermeasure node table T6000.

The processing constraint information storage unit 1621 acquires information (hereinafter, referred to as app information) on the constraint (hereinafter, referred to as an app requirement) imposed on the analysis processing (app A1000). The app information is stored in the app information table T1000. Configuration of the processing unit (node) constituting the app A1000 is stored in the node management table T3000.

The equipment constraint information storage unit 1622 stores equipment constraint information that is a correspondence relationship between each process constituting work performed using the plurality of pieces of equipment 1825 and the constraint imposed on the equipment 1825 in each process. The equipment constraint information is stored in the equipment constraint information table T4000.

The control unit P1000 controls processing of, the information collection unit P2000, the configuration plan generation unit P3000, the node arrangement unit P4000, and the processing execution unit 1625.

The information collection unit P2000 collects information necessary to generate the configuration plans. For example, the information collection unit P2000 includes a work process information acquisition unit 1624.

The work process information acquisition unit 1624 acquires the work process information, which is information on the work process performed using the plurality of pieces of equipment 1825, from the work process management server 1630.

The configuration plan generation unit P3000 generates the plurality of configuration plans related to the configuration of the app A1000 based on information collected by the information collection unit P2000. The generated configuration plans are stored in the configuration plan table T5000.

The configuration plan generation unit P3000 includes a configuration information generation unit 1623. When it is determined that a current work state is changed, the configuration information generation unit 1623 specifies the constraint to be imposed on the equipment 1825 in the changed work state and generates a configuration (that is, a configuration plan of the app A1000) of the analysis processing of the equipment 1825 satisfying the specified constraint based on the work process information and the equipment constraint information. For example, the configuration information generation unit 1623 determines that the work process is changed based on a change in operation information.

Specifically, in the analysis processing (app A1000) including the plurality of processing units (nodes), the configuration information generation unit 1623 generates information (that is, arrangement information) defining an execution subject of each processing unit and information defining a transfer route of the data between each processing unit (that is, route information).

The configuration information generation unit 1623 generates a configuration (the configuration of the app A1000) of the analysis processing of the equipment 1825 which satisfies the constraint to be imposed on the equipment 1825 and the constraint (app requirement) on the analysis processing.

When it is determined that the current work state is changed, the configuration information generation unit 1623 generates a configuration of processing (that is, cache node) that accumulates the data indicating a state of the equipment 1825 for a predetermined time, as the configuration of the analysis processing (that is, app A1000) of the equipment 1825.

When it is determined that the current work state is changed, the configuration information generation unit 1623 generates a configuration of processing (that is, queuing node) that temporarily stops the analysis processing, as the configuration of the analysis processing (that is, the processing of the app A1000) of the equipment 1825.

Information of the cache node and the queuing node is stored in the countermeasure node table T6000.

The configuration information generation unit 1623 generates a plurality of candidates (that is, configuration plans) for the configuration of the analysis processing (app A1000) of the equipment 1825, calculates for each generated candidate an evaluation value indicating an extent to which the constraint (equipment constraint information) to be imposed on the equipment 1825 is satisfied, and determines a candidate having the highest calculated evaluation value as the configuration of the analysis processing satisfying the constraint.

Next, the node arrangement unit P4000 arranges each node in the app A1000 in accordance with the information on arrangement in the edge server 1620 or the cloud 1000 and arranges the route information in the app A1000 in the edge server 1620 or the cloud 1000, based on the configuration determined from the configuration plans generated by the configuration plan generation unit P3000.

The processing execution unit 1625 performs processing (that is, the processing of the app A1000) necessary for analysis of the equipment 1825 based on the configuration generated by the configuration information generation unit 1623. That is, the processing execution unit 1625 performs processing (first processing) that is assigned to itself and is related to a configuration necessary for the analysis processing of the equipment 1825 among the configurations of the analysis processing (the processing of the app A1000) generated by the configuration information generation unit 1623.

Specifically, the processing execution unit 1625 includes a Hub unit P5000 and a node execution unit P6000. The node execution unit P6000 executes each node of the app A1000 arranged in its own (edge server 1620). The hub unit P5000 transfers data between nodes in accordance with the route information in the app A1000. Accordingly, the processing execution unit 1625 performs the processing (the processing of the app A1000) necessary for the analysis of the equipment 1825 in accordance with information (arrangement information) of the execution subject and information (route information) of the transfer route generated by the configuration information generation unit 1623.

(App Information Table)

FIG. 7 shows an example of the app information table T1000. The app information table T1000 holds app requirements.

The app information table T1000 includes, as table items, at least one record having items of, an app identifier T1010 in which an app identifier (for example, numerical value) is stored, a name T1020 (for example, used when the user who uses the equipment analysis system 1 distinguishes each app A1000 on the screen) in which a name imparted to the app A1000 (hereinafter, referred to as the app in this paragraph) that indicates an item of the app identifier T1010 is stored, a requirement T1030 (for example, a condition related to time for the app from collecting the sensor data 1920 from the equipment 1825 to completion of entire processing, a requirement related to a transfer delay of the data, information related to freshness of the collected sensor data 1920) in which a requirement (hereinafter, referred to as an app requirement) required by the app as a specification is stored, an arranged flag T1040 (for example, stored in a character string such as Yes (not arranged), No (arranged), a numerical value or other information forms) in which information (hereinafter, referred to as an arranged flag) indicating whether the app is arranged in either the edge server 1620 or the cloud 1000 is stored, and a priority T1050 in which a priority of data transfer performed by the app is stored.

(Node Management Table)

FIG. 8 shows an example of the node management table T3000. The node management table T3000 holds information related to the node of the app A1000.

The node management table T3000 includes, as table items, one or more records having items of, a node identifier T3010 in which a node identifier (for example, numerical value) is stored, an app identifier T3020 in which an identifier of the app A1000 is stored, a node type T3030 in which a node (hereinafter, referred to as the node in this paragraph) type indicating an item of the node identifier T3010 is stored, an In node T3040 in which an identifier of a node identifier of a source from which the data is transmitted to the node (the node collects the sensor data 1920) is stored, an Out node T3050 in which a node identifier of a destination to which the data is transmitted by the node is stored, an arrangement constraint T3060 in which information (arrangement information) related to an arrangement destination (the edge server 1620 or the cloud 1000) of the node is stored, collection frequency T3070 in which information on frequency (for example, every second, every 60 seconds) by which the node collects the sensor data 1920 from the equipment 1825 is stored, and a data size T3080 in which a size (for example, represented by byte units) of the sensor data 1920 collected from the equipment 1825 by the node is stored.

(Equipment Constraint Information Table)

FIG. 9 shows an example of the equipment constraint information table T4000. The equipment constraint information table T4000 holds the equipment constraint information of each equipment 1825 in the factory 1500.

The equipment constraint information table T4000 includes, as table items, one or more records having items of, a constraint identifier T4010 (for example, represented by a numerical value) in which an identifier of the equipment constraint information is stored, a work process identifier T4020 in which a work process identifier (hereinafter, referred to as work process identifier), which is a constraint (hereinafter, referred to as the constraint in this paragraph) object that indicates an item of the constraint identifier T4010, is stored, equipment information T4030 in which an identifier (hereinafter, referred to as an equipment identifier, for example, names of devices) of the equipment 1825 in the factory 1500 to be subjected to the constraint is stored, and constraint information T4040 in which contents (for example, frequency of data collection from the MES 1700 is 10 requests or less (10 RPS or less) per second) of the constraint related to the equipment 1825 indicated by an item of the equipment information T4030 in the work process indicated by an item of the work process identifier T4020 are stored.

The equipment constraint information table T4000 is updated by the work process management server 1630.

(Configuration Plan Table)

FIG. 10 shows an example of the configuration plan table T5000. The configuration plan table T5000 holds information on the configuration plan including the arrangement information and the route information as table items.

The configuration plan table T5000 includes one or more records having items of, a configuration plan identifier T5010 in which an identifier (for example, numerical value) of the configuration plan is stored, arrangement information T5020 in which information (for example, stored as "app 1: node 1=edge" when a "node 1" included in an "app 1" is arranged in the edge server 1620) indicating an arrangement location (for example, the edge server 1620 or the cloud 1000) of the node included in the app A1000 in the configuration plan (hereinafter, referred to as the configuration plan in this paragraph) indicated by an item of the configuration plan identifier T5010 is stored, route information T5030 (for example, when the "node 1" included in the "app 1" transmits data to a "node 2" and Publish/subscribe type Message Queuing Telemetry Transport (MQTT) is used as a data transfer protocol, a host IP address of the edge server 1620 or the cloud 1000 to be a transfer destination and an identifier called topic are included) in which information specifying the transfer route of the data between nodes in the app A1000 indicated by an item of the arrangement information T5020 is stored, and an evaluation value T5050 in which an evaluation value (for example, the relative evaluation value of each configuration plan is stored. It may be a numerical value such as "100" or a character string such as High/Low) of the configuration plan is stored.

In the example of the route information in FIG. 10, in a configuration plan "1", the "node 1" and the "node 2" of the "App 1" and a "node A" and a "Node B" of an "App 2" are arranged in the edge server 1620, the data is transferred from the "node 1" to the "node 2", and the data is transferred from the "node A" to the "node B".

(Countermeasure Node Table)

FIG. 11 shows an example of the countermeasure node table T6000. The countermeasure node table T6000 holds information of the countermeasure node N1330.

The countermeasure node table T6000 includes, as table items, one or more records having items of, a countermeasure node identifier T6010 in which an identifier (for example, numerical value) of the countermeasure node N1330 is stored, a countermeasure node type T6020 (for example, type of cache or queue) in which a type of the countermeasure node N1330 (hereinafter, referred to as the node in this paragraph) indicated by an item of the countermeasure node identifier T6010 is stored, and countermeasure node parameters T6030 in which parameters (for example, cache time and a queue length) related to the node are stored.

Information of the countermeasure node table T6000 may be previously created by the user, may be acquired from a server on the Internet in which the information of the countermeasure node N1330 is stored, or may be created by other methods.

(Operation Terminal)

The operation terminal 1610 includes an input and output unit P8000 as shown in FIG. 6. The input and output unit P8000 receives a data input from the user, and outputs various information to a screen.

The input and output unit P8000 includes an equipment constraint information input unit 1611. The equipment constraint information input unit 1611 receives an input of the equipment constraint information from the user.

(Cloud)

The cloud 1000 includes a processing execution unit 1005. The processing execution unit 1005 performs processing (the node arranged in the cloud 1000, that is, the second processing) related to, among the configurations of the analysis processing generated by the edge server 1620, a configuration necessary for the analysis of the equipment 1825 other than the first processing (the node arranged in the edge server 1620).

Specifically, the processing execution unit 1005 includes a Hub unit P100 and a node execution unit P200. The node execution unit P200 executes each node of the app A1000 arranged in its own (cloud 1000). The hub unit P100 transfers the data between nodes in accordance with the route information in the app A1000.

The function of each information processing apparatus described above is implemented by hardware of each information processing apparatus, or by reading out and executing programs stored in the processing device 41, the main storage device 42, and the auxiliary storage device 43 of each information processing apparatus. These programs are stored in, for example, a storage device such as a secondary storage device, a nonvolatile semiconductor memory, a hard disk drive, or an SSD, or in a non-transitory data storage media readable by each information processing apparatus such as an IC card, an SD card, and a DVD.

<Processing>

Next, processing performed in the equipment analysis system is described.

(Control Processing)

Figure 12:
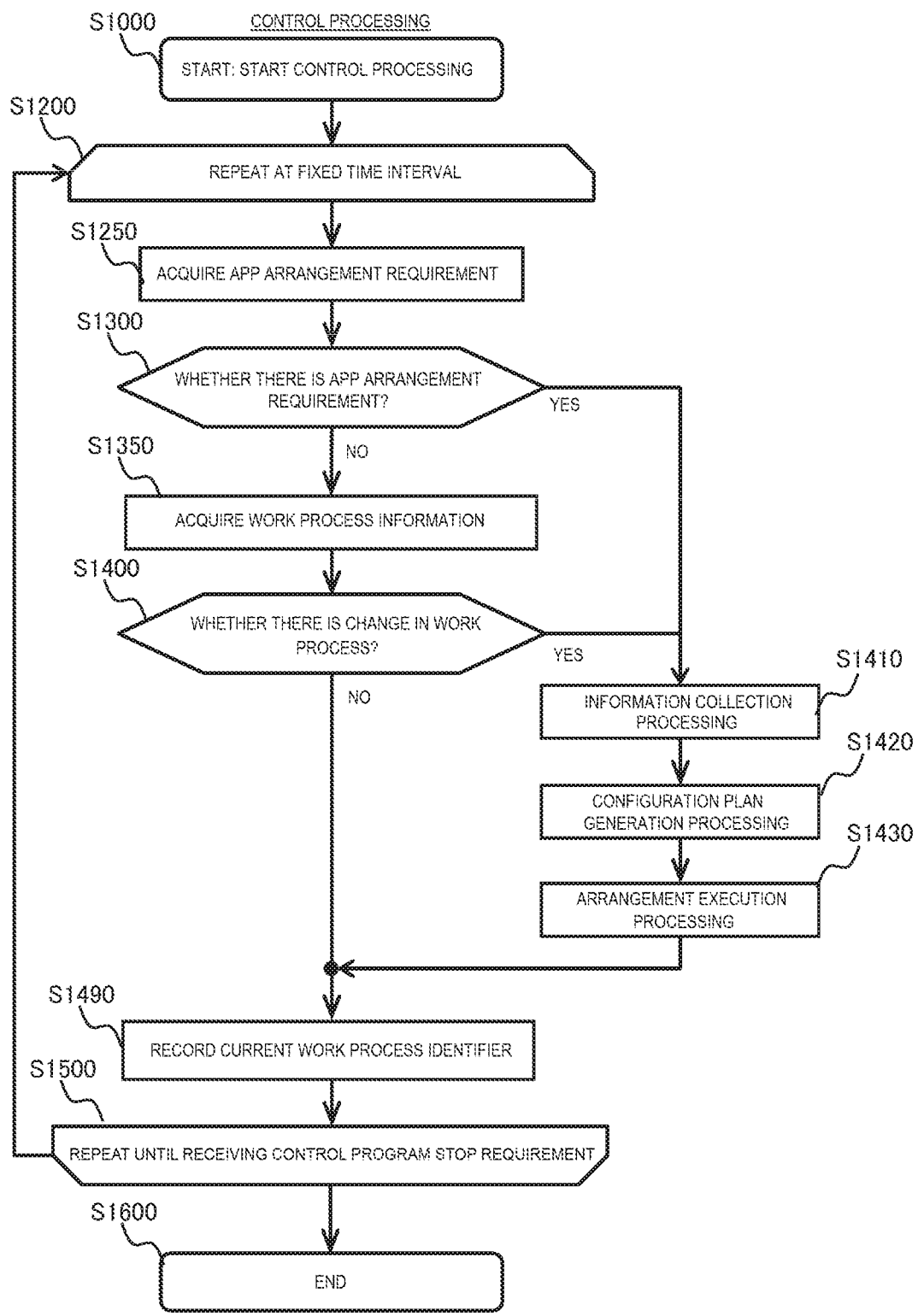
FIG. 12 is a flowchart showing an example of control processing.

FIG. 12 is a flowchart showing an example of processing (hereinafter, referred to as control processing) performed by the edge server 1620 to collect the sensor data 1920 and reconfigure the app A1000. The processing is started, for example, together with operation of the equipment 1825.

First, the control unit P1000 of the edge server 1620 acquires all arrangement requests of the nodes in the app A1000 (S1250). Specifically, for example, the control unit P1000 acquires all records in which "arranged" is stored in the arranged flag T1040 in the app information table T1000.

Next, the control unit P1000 determines whether there is at least one piece of app arrangement request information acquired in S1250 (S1300). Specifically, for example, the control unit P1000 determines whether one or more records are acquired in S1250.

When there is one or more node arrangement requests (S1300: Yes), processing of S1410 is performed, and when there is no node arrangement request (S1300: No), processing of S1350 is performed.

In S1350, the control unit P1000 acquires the work process information. Specifically, for example, the control unit P1000 acquires record information in which a "Yes" is stored in the in-execution flag T2040 in the work process management table T2000.

Then, the control unit P1000 determines whether there is a change in the work process (S1400). Specifically, for example, the control unit P1000 determines whether there is a difference between previously acquired contents of the work process identifier T2010 of each record of the work process information in S1350 and latest acquired contents of the work process identifier T2010 of each record of the work process information in S1350.

When there is a change in the work process (S1400: Yes), processing of S1410 is performed, and when there is no change in the work process (S1400: No), processing of S1490 is performed.

In S1490, the control unit P1000 stores the work process information acquired in S1350. Thereafter, the processing from S1200 is repeated until a predetermined stop request is specified (S1500). The stop request is performed, for example, by inputting a request of stopping the control processing by the user. When the stop request is specified, the control processing is completed (S1600).

Meanwhile, in S1410, the control unit P1000 executes processing (information collection processing) of collecting the sensor data 1920 and maintenance constraint information (S1410).

The control unit P1000 executes processing (configuration plan generation processing) of generating a configuration plan based on the collected data (S1420). The control unit P1000 sets, based on the generated configuration plan, information of arrangement and transfer route of each node in the app A1000 in the edge server 1620 and the cloud 1000, and executes processing (arrangement processing) of executing the app A1000 which has performed the setting (S1430). Thereafter, the processing of S1490 is performed.

A time interval of repetition of the processing from S1200 to S1500 described above is determined in consideration of factors such as processing capacity of the edge server 1620 and load of resources, for example, 10 milliseconds and 100 milliseconds. The time interval may be a fixed time or may be dynamically changed based on the above factors.

(Information Collection Processing)

Figure 13:
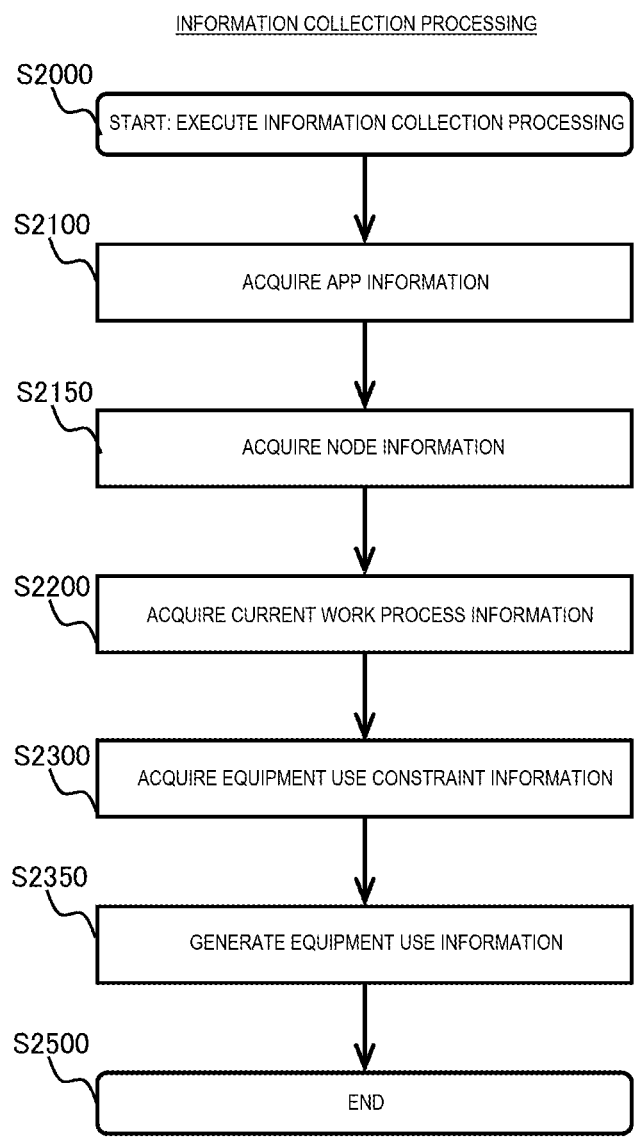
FIG. 13 is a flowchart showing an example of information collection processing.

FIG. 13 is a flowchart showing an example of the information collection processing. The information collection processing collects various types of information necessary to change node arrangement in the control processing.

First, the information collection unit P2000 of the edge server 1620 collects all information (app information) related to the app A1000 (S2100). Specifically, the information collection unit P2000 acquires all records in the app information table T1000.

Next, the information collection unit P2000 collects information on the nodes in each app A1000 (S2150). Specifically, for example, the information collection unit P2000 acquires all records, in which the identifier of the app A1000 corresponding to information collected in S2100 is stored in the app identifier T3020, in the node management table T3000.

The information collection unit P2000 acquires information (work process information) related to the work process from the work process management server 1630 (S2200). Specifically, for example, the information collection unit P2000 acquires all records in which a "Yes" is stored in the in-execution flag T2040 in the work process management table T2000.

The information collection unit P2000 acquires the equipment constraint information of each equipment 1825 in the work process indicated by the work process information acquired in S2200 (S2300). Specifically, for example, the information collection unit P2000 acquires all the records, in which the same identifier as the work process identifier T2010 of the record acquired in S2200 is stored in the work process identifier T4020, in the equipment constraint information table T4000.

The information collection unit P2000 delivers the equipment constraint information acquired in S2300 to the control processing.

The information collection processing is completed (S2500).

(Configuration Plan Generation Processing)

Figure 14:
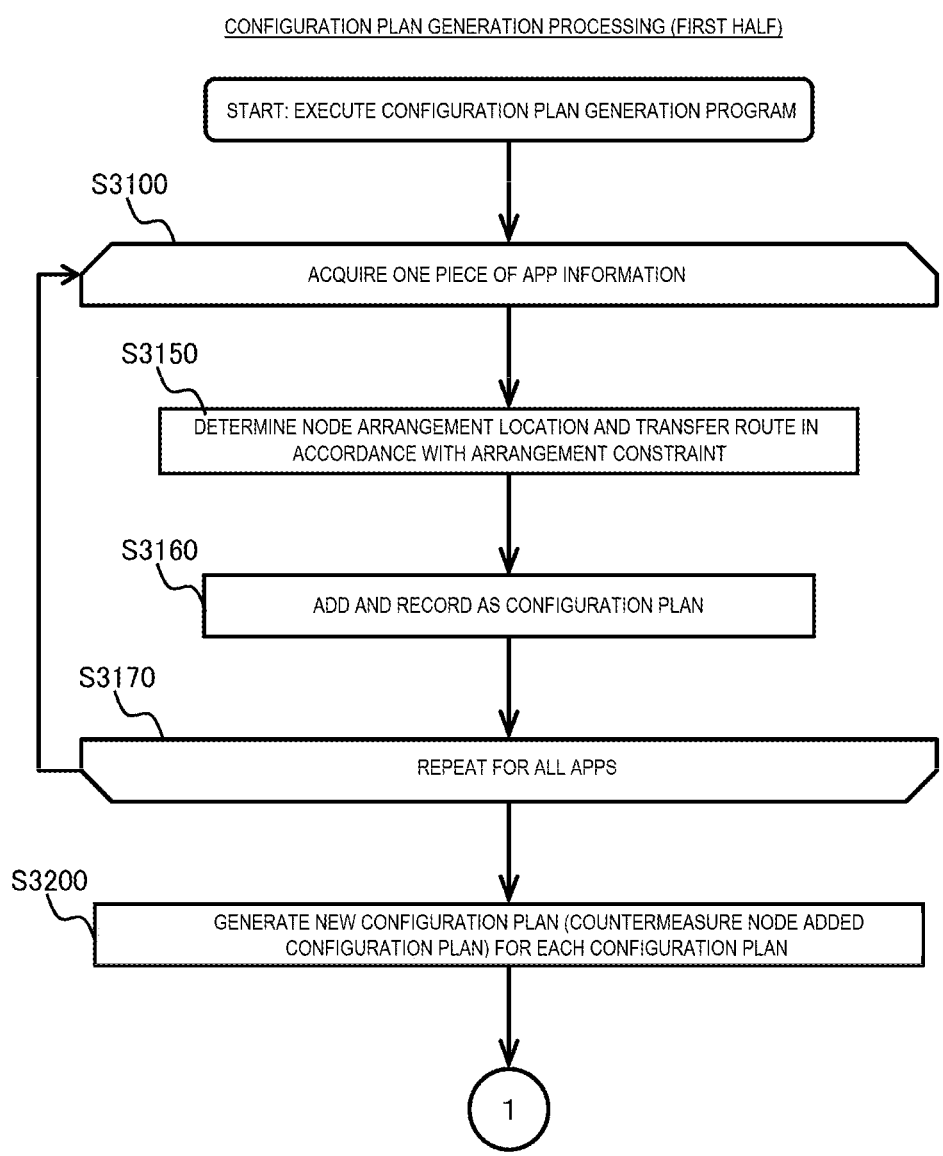
FIG. 14 is a flowchart showing an example of configuration plan generation processing (first half)
Figure 15:
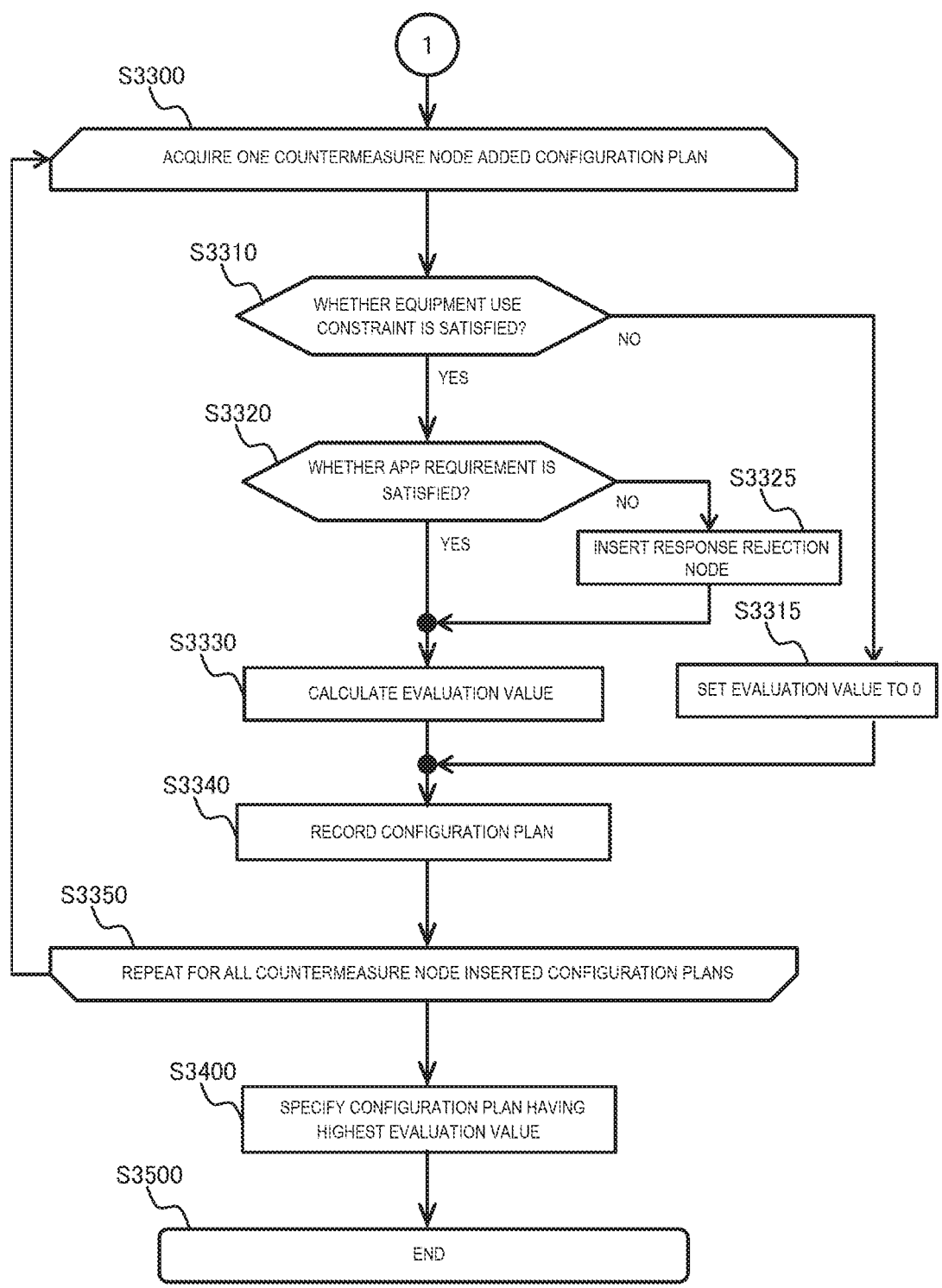
FIG. 15 is a flowchart showing an example of the configuration plan generation processing (second half)

FIGS. 14 and 15 are flowcharts showing an example of the configuration plan generation processing (divided into two due to paper space limitations). In the configuration plan generation processing, the configuration plan, which includes the arrangement information of each node and the route information between nodes, is generated based on the app information and the equipment constraint information collected in the information collection processing.

As shown in FIG. 14, the configuration plan generation unit P3000 of the edge server 1620 first selects one piece of app A1000 information among the information related to the app A1000 collected in the information collection processing, and further acquires information of each node of the selected app A1000 information (S3100). Specifically, for example, the configuration plan generation unit P3000 selects one of the records acquired in S2100 of the information collection processing. The configuration plan generation unit P3000 acquires all the records of the node management table T3000 in which the same contents as the app identifier T1010 of the selected record is stored in the app identifier T3020.

Further, the configuration plan generation unit P3000 separately determines an arrangement destination (the edge server 1620 or the cloud 1000) of each node acquired in S3100 (S3150). Specifically, for example, the configuration plan generation unit P3000 specifies a location indicated by an item of the arrangement constraint T3060 of each record acquired in S3100. At this time, the configuration plan generation unit P3000 acquires contents of the node type T3030, the In node T3040, and the Out node T3050 of each record.

The configuration plan generation unit P3000 generates the configuration plan of the app A1000 in which each node is arranged at the arrangement destination determined in S3150, and records the configuration plan in the configuration plan table T5000 (S3160). Specifically, for example, the configuration plan generation unit P3000 generates a new record of the configuration plan table T5000, sets a predetermined value in the configuration plan identifier T5010 of the generated record, stores an arrangement location of each node determined by S3100 and S3150 in the arrangement information T5020 of the record, and stores the route information, which is calculated from the In node T3040 and the Out node T3050 of each record acquired in S3150, in the route information T5030 of the record. The configuration plan generation unit P3000 separately stores the generated configuration plan from the configuration plan table T5000.

The configuration plan generation unit P3000 executes the processing of S3150 to S3160 described above for all apps A1000 collected in the information collection processing, thereby generating the configuration plan with respect to each app A1000 (S3100, S3170).

Subsequently, the configuration plan generation unit P3000 generates a new configuration plan (hereinafter, referred to as a new configuration plan) in which the countermeasure node N1330 is added in various patterns to each generated configuration plan (S3200). That is, the configuration plan generation unit P3000 generates a configuration plan in which each countermeasure node N1330 is added between any one of the nodes in the generated configuration plan.

Specifically, for example, the configuration plan generation unit P3000 selects one record from the configuration plan table T5000 generated in S3160, and refers to the arrangement information T5020 and the route information T5030 of the selected record, thereby specifying the route information between the nodes arranged in the edge server 1620. The configuration plan generation unit P3000 acquires all records from the countermeasure node table T6000, and for each record acquired, generates (may be added before a first node or after a last node) the configuration plan in which the countermeasure node indicated by the record is inserted between the above-specified two consecutive nodes (for example, between the collection node N1310 and the shaping node N1311) arranged in the edge server 1620. The above processing is repeated for all the records in the configuration plan table T5000. Accordingly, with respect to each configuration plan generated in S3160, the configuration plan generation unit P3000 generates a new configuration plan having all patterns in which all types of countermeasure nodes N1330 are arranged between all nodes. This is repeated for all the apps A1000.

When there are a plurality of nodes that collect the same type of sensor data 1920 from the same equipment 1825 when the countermeasure node is added, the configuration plan generation unit P3000 may generate a new configuration plan setting the plurality of nodes as one node.

Next, as shown in FIG. 15, the configuration plan generation unit P3000 selects one of the new configuration plans generated in S3200 (S3300). Specifically, for example, the configuration plan generation unit P3000 selects one record in the configuration plan table T5000.

The configuration plan generation unit P3000 determines whether the selected new configuration plan (hereinafter, referred to as a selected new configuration plan) satisfies the constraint of the equipment constraint information (S3310). Specifically, for example, the configuration plan generation unit P3000 determines whether the constraint is satisfied based on contents of the selected new configuration plan and the equipment constraint information acquired in S2300 of the information collection processing.

For example, when the equipment constraint information includes information indicating that frequency of a data acquisition request from the MES 1700 is 10 times or less per second, the configuration plan generation unit P3000 specifies a node that acquires the sensor data 1920 from the MES 1700 among the nodes included in the selected new configuration plan, and determines whether the collection frequency T3070 of the record of the node management table T3000, in which the specified node identifier is stored in the item of the node identifier T3010, exceeds the above-described frequency.

When the selected new configuration plan does not satisfy the constraint of the equipment constraint information (S3310: NO), the configuration plan generation unit P3000 sets a lowest value (for example, 0) as the evaluation value with respect to the selected new configuration plan, and then performs processing of S3340. Meanwhile, when the selected new configuration plan satisfies the constraint of the equipment constraint information (S3310: YES), it is determined whether the selected new configuration plan satisfies all the app requirements of the app A1000 (S3320).

Specifically, for example, the configuration plan generation unit P3000 calculates the constraint related to the data transfer that is calculated based on the arrangement information T5020 and the route information T5030 of the record selected in S3300.

Meanwhile, the configuration plan generation unit P3000 selects one record from the app information table T1000, and acquires the requirement T1030 of the selected record. Further, the configuration plan generation unit P3000 determines whether the calculated constraint satisfies the requirement indicated by the acquired requirement T1030. The configuration plan generation unit P3000 performs this processing for all the records of the app information table T1000.

When the selected new configuration plan satisfies all the app requirements of the app A1000 (S3320: Yes), processing of S3330 is performed, and when the new configuration plan does not satisfy any one of the app requirements of each app A1000 (S3320: No), processing of S3325 is performed.

In S3325, the configuration plan generation unit P3000 inserts a response rejection node into the app A1000 that does not satisfy the app requirement as determined in S3320. Specifically, for example, with respect to the selected new configuration plan, the configuration plan generation unit P3000 updates the configuration plan by inserting the response rejection node into a predetermined location (for example, first node) of the app A1000 that does not satisfy the app requirement. Thereafter, processing of S3330 is performed.

The response rejection node notifies a subsequent node (app A1000) that the data cannot be provided. In this case, the configuration plan generation unit P3000 may impart a function of notifying the subsequent node (app A1000) of information (acquired from scheduled start time T2050 and scheduled end time T2060 of the work process management table T2000) on start time and end time of the current work process to the inserted response rejection node.

In S3330, the configuration plan generation unit P3000 calculates the evaluation value with respect to the selected new configuration plan. Specifically, for example, the configuration plan generation unit P3000 calculates a design margin of the selected new configuration plan with respect to the constraint indicated by the equipment constraint information, a satisfaction degree with respect to the app requirement of the selected new configuration plan, a resource load with respect to the edge server 1620 when the app A1000 is executed based on the selected new configuration plan, and other indexes.

The configuration plan generation unit P3000 records the evaluation value calculated in S3330 (S3340). Specifically, for example, the configuration plan generation unit P3000 stores the calculated evaluation value in the evaluation value T5050 of the record selected in S3300. The information stored in the evaluation value T5050 may be any information as long as superiority or inferiority between configuration plans can be determined, and may be a numerical value, a character string such as High/Low, or other information.

The configuration plan generation unit P3000 executes the above-described processing of S3310 to S3340 for all the new configuration plans generated in S3200 (S3300, S3350). The configuration plan generation unit P3000 may perform the processing of S3310, S3320, and S3330 in S3200 and clearly exclude the configuration plan that does not satisfy an equipment use constraint from a generation target of the new configuration plan.

Subsequently, the configuration plan generation unit P3000 sorts the calculated evaluation values, and specifies a configuration plan having the highest evaluation value based thereon (S3400). Specifically, for example, the configuration plan generation unit P3000 sorts each record of the configuration plan table T5000 in which information of the evaluation value is stored in the evaluation value T5050 in an ascending order. The configuration plan generation unit P3000 specifies a record having the highest evaluation value indicated by the evaluation value T5050 based on the sorted record.

The configuration plan generation unit P3000 delivers the configuration plan having the highest evaluation value to the control processing. The configuration plan generation processing is completed (S3500). Specifically, for example, the configuration plan generation unit P3000 delivers contents of the configuration plan identifier T5010 of the configuration plan of the record specified in S3400 to the control processing. At this time, the configuration plan generation unit P3000 may store the configuration plan having the highest evaluation value.

The new configuration plan generated in the configuration plan generation processing may be an enormous number depending on the number of apps A1000, the number of countermeasure nodes, or the relationship between nodes, so that the app A1000 which is a target of generating the new configuration plan may be limited. For example, the configuration plan generation unit P3000 may create only the new configuration plan associated with the app A1000 having a low priority indicated by an item of the priority T1050 of the app information table T1000 among the apps A1000.

(Arrangement Processing)

Figure 16:
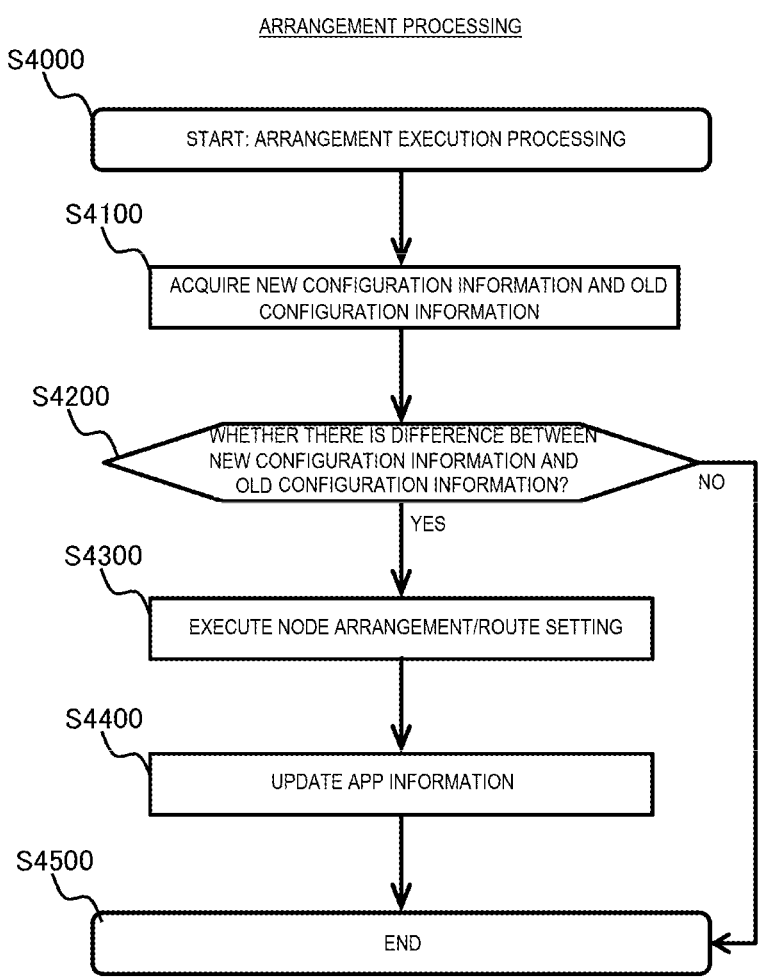
FIG. 16 is a flowchart showing an example of arrangement processing.

FIG. 16 is a flowchart showing an example of the arrangement processing. The node arrangement unit P4000 of the edge server 1620 selects one of the configuration plans previously stored in S3160 and obtained by the configuration plan generation processing, and acquires a new configuration plan corresponding to the selected configuration plan from the configuration plan table T5000 (S4100).

The node arrangement unit P4000 specifies a difference between the selected configuration plan and the acquired new configuration plan (S4200). When there is a difference (S4200: YES), processing of S4300 is performed, and when there is no difference (S4200: NO), the arrangement processing is completed (S4500).

In S4300, the node arrangement unit P4000 sets the arrangement and the transfer route of the node for each app A1000 in accordance with the new configuration plan (S4300).

Specifically, for example, the node arrangement unit P4000 selects the arrangement information T5020 of each record in the configuration plan table T5000, and acquires the arrangement location of each node of each app A1000. When the arrangement location is the edge server 1620, the node execution unit P6000 is set such that the node execution unit P6000 of the edge server 1620 executes the node, and when the arrangement location is the cloud 1000, the node execution unit P200 is set such that the node execution unit P200 of the cloud 1000 executes the node.

Further, the node arrangement unit P4000 selects the route information T5030 of each record of the configuration plan table T5000, and acquires the transfer route of each node of each app A1000. When the arrangement location of the node is set as the edge server 1620, the node arrangement unit P4000 sets to transfer the data based on the transfer route to the Hub unit P5000 of the edge server 1620, and when the arrangement location of the node is set as the cloud 1000, the node arrangement unit P4000 sets to transfer the data based on the transfer route to the Hub unit P100 of the cloud 1000.

The node arrangement unit P4000 records the arrangement location and the transfer route of the node that are set with respect to each app A1000 (S4400). Specifically, for example, the node arrangement unit P4000 sets a "Yes" in the arranged flag T1040 of each record in which the identifier of the app A1000, which has the arrangement location and the transfer route of the node set in S4300, is stored in the item of the app identifier T1010. Thereafter, the arrangement processing is completed (S4500).

(Equipment Constraint Information Input Screen)

Figure 17:
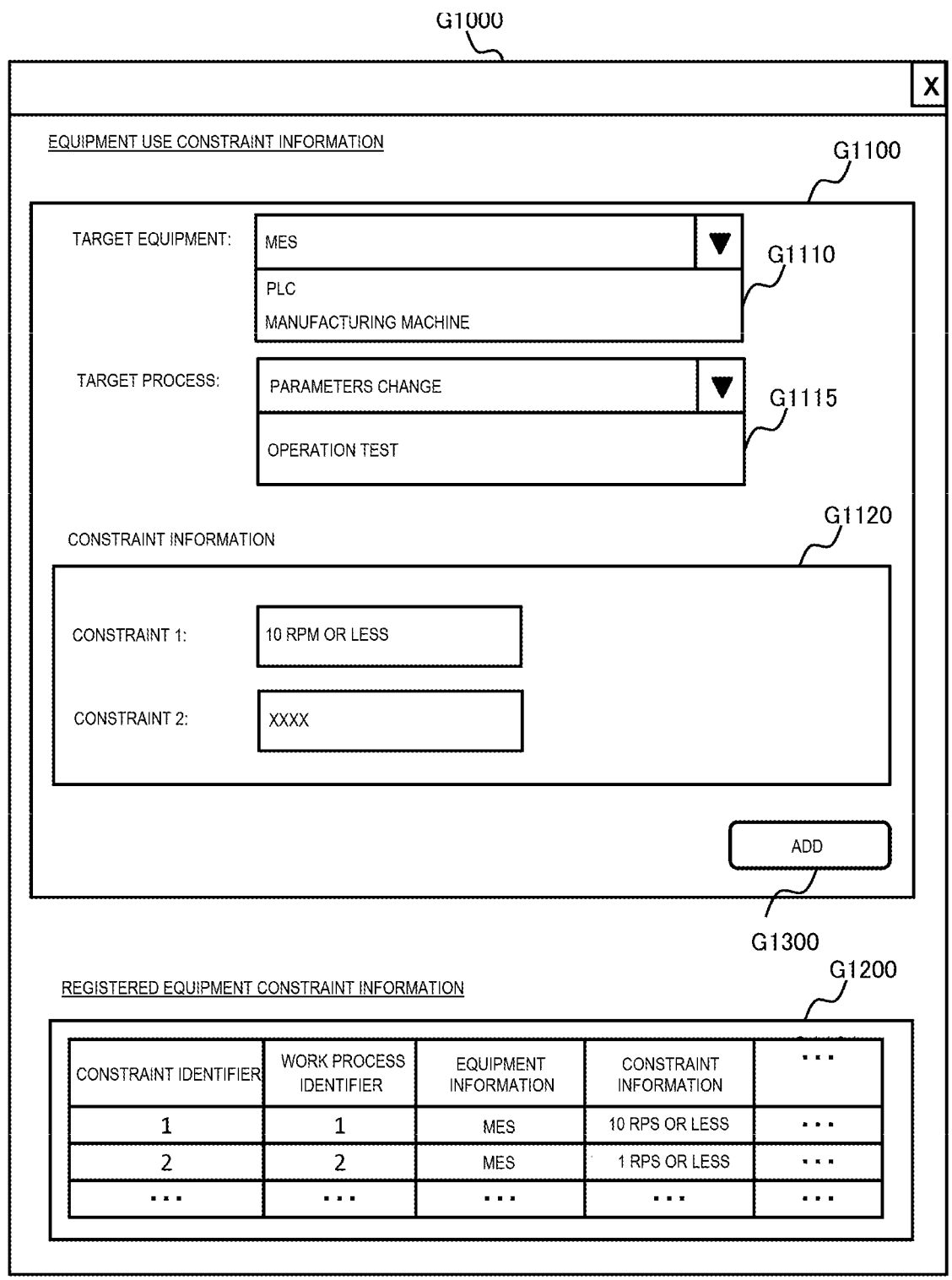
FIG. 17 shows an example of an equipment constraint information input screen.

FIG. 17 shows an example of a screen (equipment constraint information input screen) to input the equipment constraint information. An equipment constraint information input screen G1000 includes an equipment constraint information input field G1100 that receives an input of the equipment constraint information, and an equipment constraint information display field G1200 that displays contents of the input equipment constraint information.

The equipment constraint information input field G1100 includes an equipment selection field G1110 to select the equipment 1825, a work process selection field G1115 to select the work process, an equipment constraint information input field G1120 to input specific contents of the equipment constraint information, and a registration field G1300 to transmit these input or selected information to the edge server 1620 and to update the equipment constraint information table T4000.

The equipment constraint information input field G1120 allows a plurality of pieces of equipment constraint information to be input at a time. The equipment constraint information input screen G1000 may include an item or a button to edit and update the input equipment constraint information. Further, the equipment constraint information input field G1120 may include a display field that displays all or a part of the equipment constraint information table T4000 and other information.

As described above, in the equipment analysis system 1 of the present embodiment, when it is determined that the current work state is changed, the edge server 1620 generates the configuration (a node configuration of the app A1000) of the analysis processing of the equipment 1825 that satisfies the constraint to be imposed on the equipment 1825 in the changed work state based on work process information and equipment constraint information. Since the processing necessary for the analysis of the equipment 1825 is performed based on the generated configuration, the edge server 1620 generates the configuration of the app A1000 corresponding to the change even when the work process is changed and a change in the constraint on the equipment occurs. Since processing necessary for analysis corresponding thereto is performed, even if the work process is changed, the edge server 1620 can perform the analysis processing (analysis by the IoT app) without affecting the equipment 1825, and can perform the work process smoothly. For example, since the IoT app can appropriately change a method, a route, or a timing of collecting the data, an unexpected load to be imposed on the present equipment can be avoided, and the work can be performed smoothly. Accordingly, according to the equipment system 1 (particularly, the edge server 1620) of the present embodiment, the analysis of the equipment can be performed without inhibiting the progress of the work.

The above description of the embodiment is intended to facilitate the understanding of the invention but is not intended to limit the invention. The invention can be modified and improved without departing from its spirit and includes equivalents thereof.

For example, in the present embodiment, a coating work is described as an example of a target work, but the work to which the invention is applied is not limited thereto. The invention is widely applicable to work in a field using each equipment or apparatus, and a field to which a so-called IoT technology can be applied.

According to the above description of the present specification, at least the following matters are apparent. That is, in the equipment analysis system 1 of the present embodiment, when it is determined that the current work state is changed, the configuration information generation unit may generate the configuration of the processing of accumulating the data indicating the state of the equipment for the predetermined time, as the configuration of the analysis processing of the equipment.

In this manner, a configuration of the cache node is generated as the configuration of the analysis processing (app A1000), and the cache node temporarily accumulates the sensor data 1920 in advance even when acquisition of the sensor data 1920 via the MES 1700 by the app A1000 is temporarily impossible due to the change in the work process, so that the app A1000 can acquire the sensor data 1920 from the cache node and continue the analysis of the equipment 1825.

In the equipment analysis system 1 of the present embodiment, when it is determined that the current work state is changed, the configuration information generation unit may generate a configuration of processing of stopping the analysis processing as the configuration of the analysis processing of the equipment.

In this manner, a configuration of the response rejection node is generated as the configuration of the analysis processing (app A1000). When the acquisition of the sensor data 1920 via the MES 1700 by the app A1000 is temporarily impossible due to the change in the work process, the app A1000 can stop the acquisition of the sensor data 1920 by itself and not impose a burden on the work caused by the equipment 1825 or the MES 1700.

In the equipment analysis system 1 of the present embodiment, the configuration information generation unit may generate the plurality of candidates for the configuration of the analysis processing of the equipment, may calculate for each generated candidate the evaluation value indicating the extent to which the constraint to be imposed on the equipment is satisfied, and may determine the candidate having the highest calculated evaluation value as the configuration of the analysis processing satisfying the constraint.

In this manner, a load or a burden to be imposed on the equipment 1825 can be minimized by creating the plurality of configuration plans and determining among the configuration plans a configuration that satisfies constraint on the equipment 1825 as the configuration of the app A1000.

In the equipment analysis system 1 of the present embodiment, the configuration information generation unit may generate the information defining the execution subject of each processing unit and the information defining the transfer route of the data between each processing unit in the analysis processing including the plurality of processing units, and the processing execution unit may perform the processing necessary for the analysis of the equipment in accordance with the generated execution subject and the transfer route.

In this manner, a processing load is distributed in accordance with the work process. As a result, the work can be smoothly continued by executing the analysis processing (the processing of the app A1000) in which the execution subject and the data transfer route are defined.

The equipment analysis system 1 of the present embodiment may include the processing constraint information storage unit that acquires information on the constraint imposed on the analysis processing, and the configuration information generation unit may generate the configuration of the analysis processing that satisfies the constraint to be imposed on the specified equipment and a constraint on the analysis processing.

In this manner, the constraint on the equipment 1825 can be satisfied and the analysis processing corresponding to a specification of the app A1000 can be performed by generating the configuration of the analysis processing (the configuration of the app A1000) satisfying the constraint based on the equipment constraint information and the app information. Thus, even in the app A1000 (IoT app) having various specifications, the analysis processing can be performed without inhibiting the work process.

The equipment analysis system 1 of the present embodiment may include the equipment constraint information input unit that receives the input of the equipment constraint information from the user.

Accordingly, the user can set various constraints to be imposed on the equipment 1825 in the equipment analysis system 1.

The equipment analysis system 1 of the present embodiment may include the equipment analysis support apparatus and the information processing system. The equipment analysis support apparatus includes the equipment constraint information storage unit that stores the equipment constraint information which is the correspondence relationship between each process including the work performed using the plurality of pieces of equipment and the constraint to be imposed on the equipment in each process, the work process information acquisition unit that acquires the work process information which is information on a process of the work currently in progress, the configuration information generation unit that, when it is determined that the current work state is changed, specifies the constraint to be imposed on the equipment in the changed work state and generates the configuration of the analysis processing of the equipment satisfying the specified constraint based on the acquired work process information and the equipment constraint information, and the processing execution unit that performs the first processing which is assigned to itself and is related to the configuration necessary for the analysis of the equipment among the generated configurations of the analysis processing. The information processing system includes the processing execution unit that performs, other than the first processing, the processing related to the configuration necessary for the analysis of the equipment among generated configurations of the analysis processing.

In this manner, in the equipment analysis system 1, each of the edge server 1620 (equipment analysis support apparatus) and the cloud 1000 (information processing system) performs the analysis processing of the app A1000 assigned to itself, so that the analysis processing can be efficiently performed in accordance with each characteristic.

Although the present disclosure has been described with reference to example embodiments, those skilled in the art will recognize that various changes and modifications may be made in form and detail without departing from the spirit and scope of the claimed subject matter.

What is claimed is:

1. An equipment analysis support apparatus comprising:
an equipment constraint information storage unit that stores equipment constraint information which is a correspondence relationship between each process constituting work performed using a plurality of pieces of equipment and a constraint to be imposed on the equipment in each process;
a work process information acquisition unit that acquires work process information which is information on a process of the work currently in progress;
a configuration information generation unit that, when it is determined that a current work state is changed, specifies a constraint to be imposed on the equipment in the changed work state and generates a configuration of analysis processing of the equipment satisfying the specified constraint, based on the acquired work process information and the equipment constraint information; and
a processing execution unit that performs processing necessary for analysis of the equipment based on the generated configuration.

2. The equipment analysis support apparatus according to claim 1, wherein
the configuration information generation unit generates, when it is determined that the current work state is changed, a configuration of processing of accumulating data indicating a state of the equipment for a predetermined time, as the configuration of the analysis processing of the equipment.

3. The equipment analysis support apparatus according to claim 1, wherein
the configuration information generation unit generates, when it is determined that the current work state is changed, a configuration of processing of stopping the analysis processing as the configuration of the analysis processing of the equipment.

4. The equipment analysis support apparatus according to claim 1, wherein
the configuration information generation unit generates a plurality of candidates for the configuration of the analysis processing of the equipment, calculates for each generated candidate an evaluation value indicating an extent to which the constraint to be imposed on the equipment is satisfied, and determines a candidate having a highest calculated evaluation value as the configuration of the analysis processing satisfying the constraint.

5. The equipment analysis support apparatus according to claim 1, wherein
the configuration information generation unit generates, in the analysis processing including a plurality of processing units, information defining an execution subject of the processing units and information defining a transfer route of data between the processing units, and
the processing execution unit performs the processing necessary for the analysis of the equipment in accordance with the generated execution subject and the transfer route.

6. The equipment analysis support apparatus according to claim 1 comprising:
a processing constraint information storage unit that acquires information on the constraint imposed on the analysis processing, wherein
the configuration information generation unit generates the configuration of the analysis processing which satisfies the constraint to be imposed on the specified equipment and a constraint on the analysis processing.

7. The equipment analysis support apparatus according to claim 1 comprising:
an equipment constraint information input unit that receives an input of the equipment constraint information from a user.

8. An equipment analysis support method comprising:
executing, by an equipment analysis support apparatus,
equipment constraint information storage processing of storing equipment constraint information which is a correspondence relationship between each process constituting work performed using a plurality of pieces of equipment and a constraint to be imposed on the equipment in each process;
work process information acquisition processing of acquiring work process information which is information on a process of the work currently in progress;
configuration information generation processing of specifying, when it is determined that a current work state is changed, a constraint to be imposed on the equipment in the changed work state and generates a configuration of analysis processing of the equipment satisfying the specified constraint, based on the acquired work process information and the equipment constraint information; and
processing execution processing of performing processing necessary for analysis of the equipment based on the generated configuration.

9. The equipment analysis support method according to claim 8, wherein
in the configuration information generation processing, the equipment analysis support apparatus generates, when it is determined that the current work state is changed, a configuration of processing of accumulating data indicating a state of the equipment for a predetermined time as the configuration of the analysis processing of the equipment.

10. The equipment analysis support method according to claim 8, wherein
in the configuration information generation processing, the equipment analysis support apparatus generates, when it is determined that the current work state is changed, a configuration of processing of stopping the analysis processing as the configuration of the analysis processing of the equipment.

11. The equipment analysis support method according to claim 8, wherein
in the configuration information generation processing, the equipment analysis support apparatus generates a plurality of candidates for the configuration of the analysis processing of the equipment, calculates for each generated candidate an evaluation value indicating an extent to which the constraint to be imposed on the equipment is satisfied, and determines a candidate having a highest calculated evaluation value as the configuration of the analysis processing satisfying the constraint.

12. The equipment analysis support method according to claim 8, wherein
in the configuration information generation processing, the equipment analysis support apparatus generates, in the analysis processing including a plurality of processing units, information defining an execution subject of the processing units and information defining a transfer route of the data between the processing units; and
a processing execution unit performs the processing necessary for the analysis of the equipment in accordance with the generated execution subject and the transfer route.

13. The equipment analysis support method according to claim 8, wherein
the equipment analysis support apparatus executes processing constraint information storage processing of acquiring information on the constraint imposed on the analysis processing, and
in the configuration information generation processing, the equipment analysis support apparatus generates the configuration of the analysis processing which satisfies the constraint to be imposed on the specified equipment and a constraint on the analysis processing.

14. The equipment analysis support method according to claim 8, wherein
the equipment analysis support apparatus executes equipment constraint information input processing of receiving an input of the equipment constraint information from a user.

15. An equipment analysis system comprising:
an equipment analysis support apparatus; and
an information processing system, wherein
the equipment analysis support apparatus includes:
an equipment constraint information storage unit that stores equipment constraint information which is a correspondence relationship between each process constituting work performed using a plurality of pieces of equipment and a constraint to be imposed on the equipment in each process;
a work process information acquisition unit that acquires work process information which is information on a process of the work currently in progress;
a configuration information generation unit that, when it is determined that a current work state is changed, specifies a constraint to be imposed on the equipment in the changed work state and generates a configuration of analysis processing of the equipment satisfying the specified constraint, based on the acquired work process information and the equipment constraint information; and
a processing execution unit that performs a first processing according to a configuration among generated configurations of the analysis processing, the configuration being assigned to itself and being necessary for analysis of the equipment, and
the information processing system includes:
a processing execution unit that performs, other than the first processing, processing according to the configuration among the generated configurations of the analysis processing, the configuration being necessary for the analysis of the equipment.

* * * * *